United States Patent [19]

Bernard

[11] 4,042,343
[45] Aug. 16, 1977

[54] FIRE LOG PROCESS AND APPARATUS
[75] Inventor: Brian C. Bernard, Oakland, Calif.
[73] Assignee: The Clorox Company, Oakland, Calif.
[21] Appl. No.: 616,950
[22] Filed: Sept. 26, 1975
[51] Int. Cl.² ........................... C10L 5/00; C10L 5/22
[52] U.S. Cl. ........................................ 44/10 B; 44/13; 44/24
[58] Field of Search ................ 44/10 R, 10 B, 11–13, 44/24, 2; 62/63

[56] References Cited
U.S. PATENT DOCUMENTS

| 2,212,916 | 8/1940 | Hawkins et al. | 62/63 X |
| 2,833,633 | 5/1958 | Hecht | 44/13 |
| 3,227,530 | 1/1966 | Levelton | 44/10 R |
| 3,726,651 | 4/1973 | Ronden | 44/10 R |
| 3,843,336 | 10/1974 | Messman | 44/10 R |

Primary Examiner—Carl F. Dees
Attorney, Agent, or Firm—Phillips, Moore, Weissenberger, Lempio & Majestic

[57] ABSTRACT

A process and apparatus for producing fire logs from a granular combustible starting ingredient and a hot binder includes a continuous cooler so that the entire process may be continuous from starting ingredients to final product. A combustible starting ingredient in the form of sawdust is mixed to a mixer with hot wax to form a hot mixture which is conveyed to the cooler. Cooled air enters the cooler lower portion and rises upwardly between a plurality of spaced transversely oriented rotatable rollers of a conveyor arrangement, which arrangement conveys the hot product through its cooling process to an outlet end of the cooler. The hot product that passes between the rollers is in turn conveyed by a pair of screw conveyors to the same outlet. Heated air is exhausted through an exhaust outlet. The conveyor rollers are interconnected whereby driving a first of the rollers correspondingly drives each of the others in the same direction. Elongated scrapers are mounted adjacent each of the rollers for removing adhered product. A refrigeration unit is included for cooling the inlet air to the cooler. A salt feeder is provided for adding flame enhancing chemicals to the cooled mixture prior to entering an extruder where fire log shapes are produced. The process is completed by cutting the fire log shapes to length and wrapping in a protective cover.

16 Claims, 5 Drawing Figures

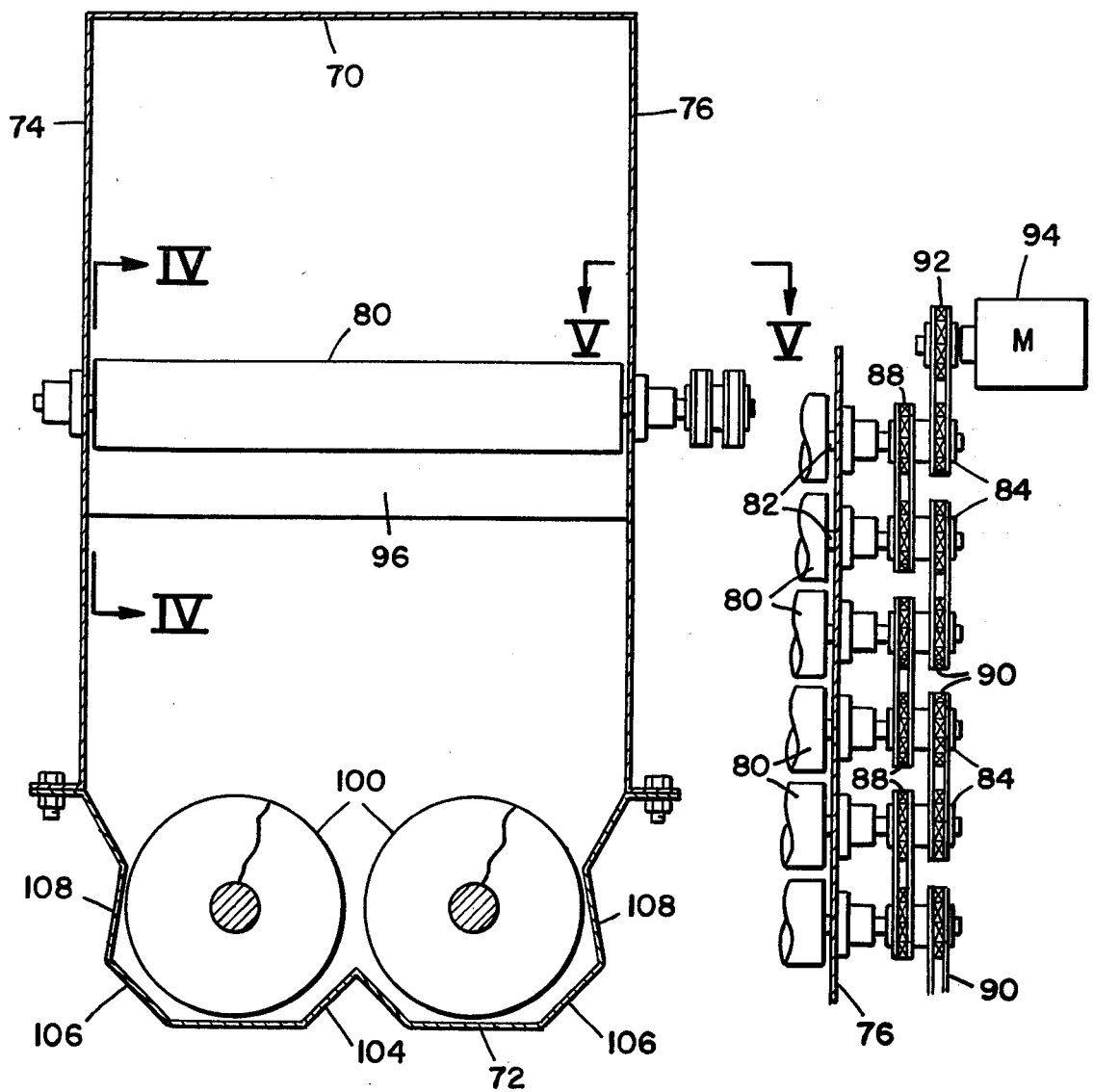
FIG_3
FIG_5
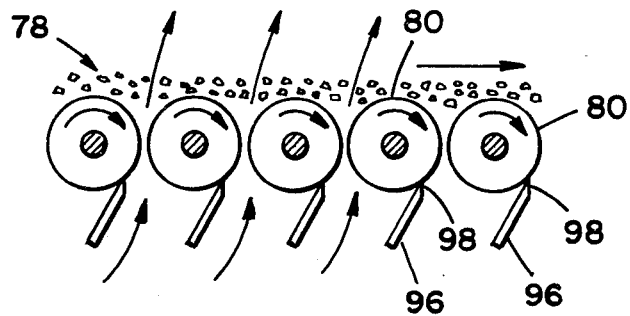
FIG_4

FIRE LOG PROCESS AND APPARATUS

BACKGROUND OF THE INVENTION

This invention relates to process and apparatus for continually producing fire logs of the type comprised of sawdust held together with a wax binder. Particularly, this invention relates to such a process which is continuous and includes a continuous cooler for treating the hot sawdust-wax mixture to obtain a proper consistency prior to forming in an extruder.

Currently, large numbers of fire logs are on the market intended for home use. These manufactured fire logs are typical fire log size and shape and have advantages over natural wood logs. One advantage is the long burning nature of these manufactured logs which eliminates the necessity of frequent feeding of the fire. Also, less storage space is required, since only a single log is required for a period of burning of perhaps three hours. Further, fire enhancing chemicals can be added to the logs which produce the desirable coloration of flame, especially in the blue and green areas which are not found in natural wood logs. Another advantage of these manufactured fire logs is that they utilize a waste product, sawdust, in their manufacture. Lumber mills and other operations that saw wood produce great quantities of sawdust which otherwise is merely incinerated to eliminate the disposal problem. However, with the advent of the manufactured fire logs this sawdust liability has turned into a sawdust asset.

In manufacturing fire logs from sawdust the conventional process is to combine sawdust with hot wax in a mixer to produce a hot product. However, this hot product cannot be formed or extruded into the fire log shape in its hot condition. Accordngly, the practice has arisen wherein the hot product is placed into large bins and trucked away from the mixer by use of the fork lift trucks, etc., to a storage yard. In the storage yard ambient cooling of the hot mixture occurs over a time. After the mixture has cooled, it is then taken to the extruder where it is fed therein to produce the fire log shape. This batch processing of the prior art has had serious disadvantages. For instance, it is quite costly in terms of time and money to have to individually bin the hot mixture and transport it to the cooling yards. Also, the texture and consisting of the mixture is not completely controllable since it is subject to the vagaries of the ambient surrounds. Further, wasted energy is involved in the transportation of the bins which has to be accomplished both from and to the plant.

It is to a solution of these and other problems that this invention is directed.

SUMMARY AND OBJECTS OF THE INVENTION

It is therefore the primary object of this invention to provide a process apparatus for the continuous production of fire logs.

It is a further object of this invention to provide such a process and apparatus which provides for more enonomical operation than has previously been the case.

It is a further object of the invention to provide an apparatus in the form of a cooler which continuously cools a hot product.

The invention takes the form of a process wherein sawdust and hot wax are combined in a mixer. The mixture is conveyed by means of a screw conveyor to a large cooler. A combination of refrigerated and ambient air is mixed and enters the cooler at the lower part of the inlet end thereof. The hot product is conveyed from the inlet end to the outlet end of the cooler on a roller conveyor consisting of a series of transversely oriented motor driven rollers. The rollers are driven by means of a motor and chain drive interconnecting adjacent pairs of rollers. In this manner, long links of chain are avoided and consequent breakage minimized. Scraper bars are located adjacent each roller to remove the adhered material which may have collected thereon. The material dropping through the rollers collects on the bottom floor of the cooler and is conveyed to the outlet by a pair of screw conveyors which are also motor driven. The now heated air is exhausted through the outlet of the cooler. The cooled product is expelled from the outlet end of the cooler and is transported on an inclined belt conveyor to a surge or live bottom hopper. From the surge hopper the cooled mixture enters an inclined screw conveyor where a color salt feeder adds compounds and enhances the fire effect of the log. The mixture is then transported to an extruder where fire log shapes are extruded. A knife cut-off machine cuts the extruded shape to fire log length and a wrapper wraps a protective paper cover over the finished log. After check weighing, the logs are hand case packed and palletized.

Further and other objects of this invention will become more readily apparent from a review of the following description and the accompanying drawings.

BRIEF DESCRIPTION OF THE DRAWINGS

FIG. 3 is a vertical cross-sectional elevational view taken along lines III—III in FIG. 2;

FIG. 4 is a cross-sectional view taken along the lines IV—IV in FIG. 3; and

FIG. 5 is a cross-sectional view taken along the lines V—V in FIG. 3.

DETAILED DESCRIPTION

Figure 1:
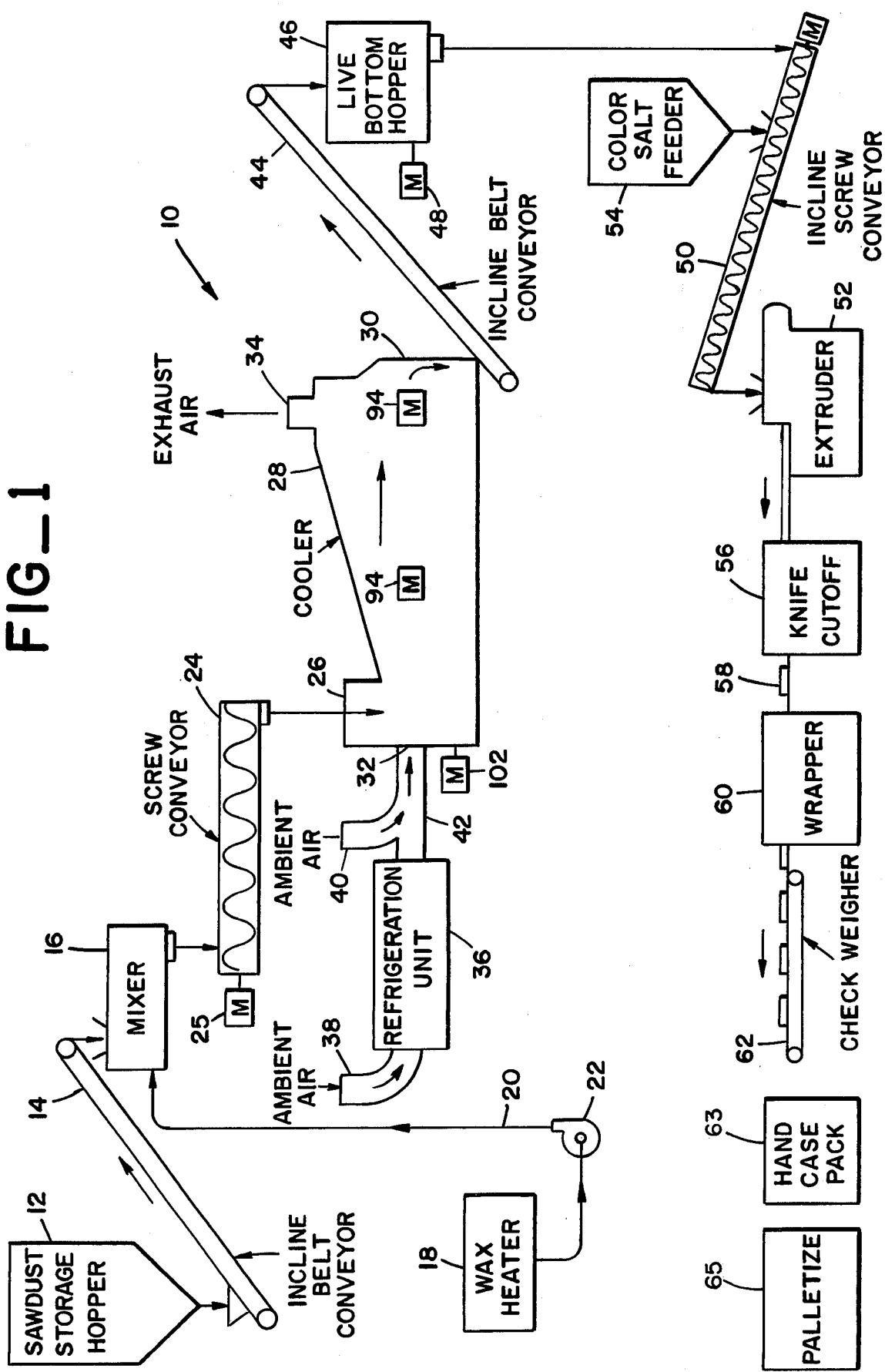
FIG. 1 is an overall schematic view of the continuous fire log manufacturing process of this invention and including the cooler therein.

Turning to FIG. 1, there is shown generally at 10 a process schematic for the continuous production of fire logs from a granular combustible starting ingredient such as sawdust and a hot binder such as wax. The sawdust is first stored in a sawdust storage hopper 12 as one of the starting products. The sawdust is discharged from the bottom of the hopper 12 onto the bottom of an incline belt conveyor 14 on which it is conveyed to the top of a mixer 16. In like manner, a binder starting ingredient, such as parafin wax, is heated to its melting temperature in a wax heater 18. It is then pumped through conduit 20 to the mixer 16 for mixing with the sawdust ingredient.

Mixer 16 may conveniently be used, which has a continuous double paddle screw so that the sawdust and hot wax starting ingredients may be combined at the entrance end of the mixer and continuously conveyed to the discharge end to be dropped through a bottom discharge outlet onto one end of a horizontally disposed screw conveyor 24. Motor 25 drives the horizontally disposed screw conveyor 24 to carry the hot mixture to one end thereof, where it is dropped through an outlet into an inlet 26 of the continuous cooler 28, as will be more fully described hereinafter. The hot mixture is then conveyed through an outlet 30.

During this conveyance the hot mixture is cooled to become a cooled mixture by means of air entering the cooler through an air inlet 32 and exhausted through an air outlet 34. Refrigeration unit 36 chills ambient air and combines same with ambient air from ambient air inlet 38. Further ambient air entering from ambient air inlet 40 is combined with the refrigerated air into a mixture chamber 42 prior to entering cooler 28.

The cooled mixture is then transported by an incline belt conveyor 44 to the top of a live bottom or surge hopper 46. The function of the live bottom hopper is to provide live or surge storage of the cool mixture and keep it from solidifying into a hardened mass. It accomplishes this function by means of a plurality of screws in the bottom area thereof driven by motors 48.

The mixture then leaves the live bottom hopper 46 and enters an incline screw conveyor 50 from whence it is transported to extruder 52. As an intermediate step, the fire enhancement chemicals such as color salts are discharged from color salt feeder 54 into incline screw conveyor 50 at a point intermediate its ends. In this manner, the color salts are intimately mixed with the sawdust-wax mixture prior to being extruded.

An extruder 52 extrudes the mixture into a generally cylindrical, elongated fire log shape to be conveyed from the extruder. The fire log shape enters the knife cut-off machine 56 where the shape is cut to fire log length. The fire log 58 leaving the knife cut-off machine then passes to wrapper machine 60 where the protective paper wrap is applied. The logs are then weighed by check weigher 62 and conveyed to where they are hand case packed at 63 into cases and then palletized for storage at 65.

Figure 2:
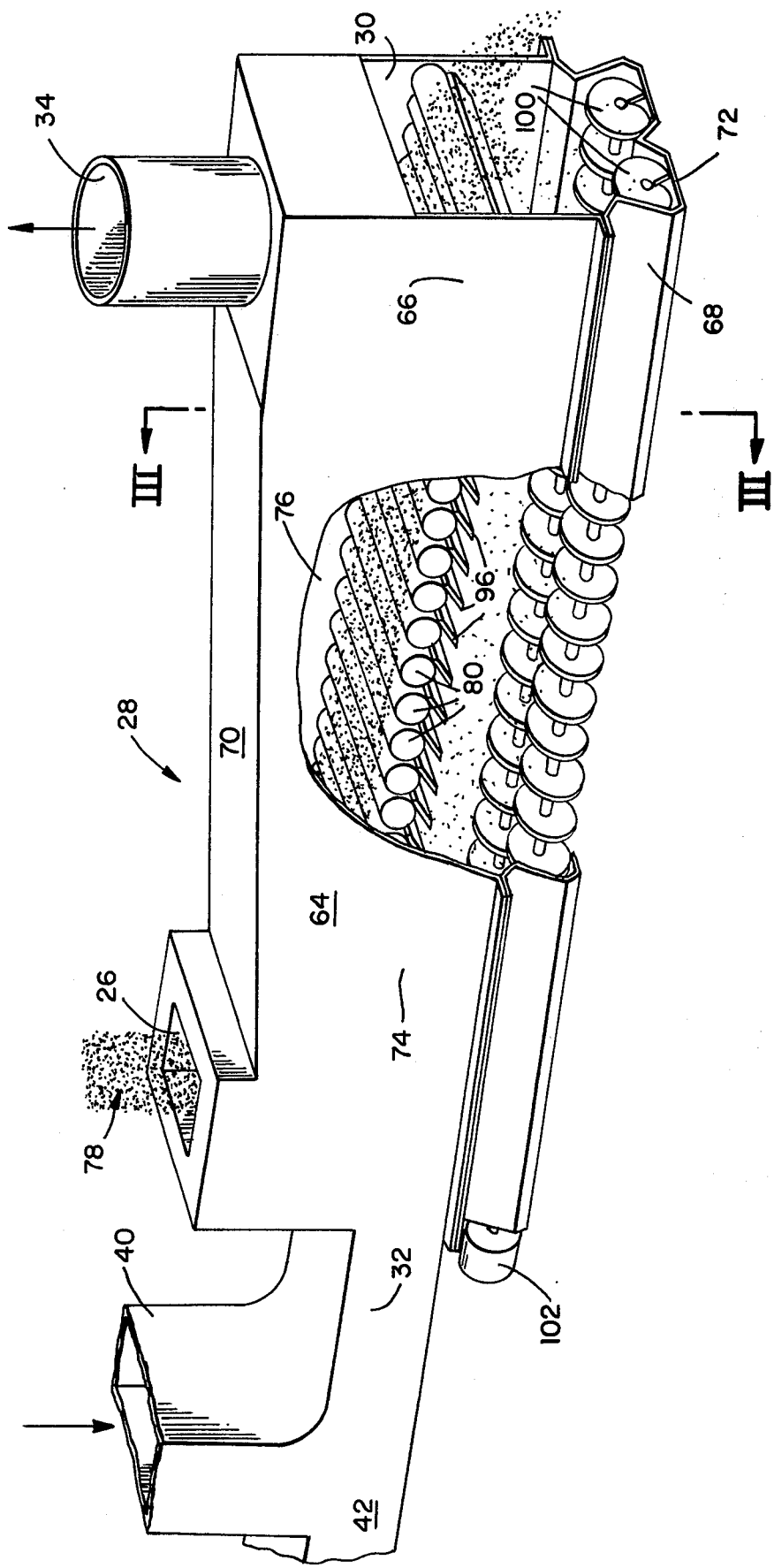
FIG. 2 is a top-quarter isometric view partially cut away of the cooler of FIG. 1.

Turning to FIGS. 2-5, more particular details of cooler 28 may be seen. With particular reference to FIG. 2, cooler 28 is shown to be comprised of a hollow, generally rectangular body 64 having top half section 66 fitted over bottom section 68. The entire body forms an inclined top or ceiling portion 70 which is connected to a floor portion 72 by sidewalls 74, 76. As may be seen, a hot product 78 enters the inlet opening 26 in the top portion of the body 64, drops onto the inlet end of the roller conveyor comprised of a plurality of rollers 80 mounted transverse to the longitudinal direction of the cooler. The rollers 80, as best seen in FIG. 5, are mounted on shafts 82, each having a double sprocket 84 thereon. Chains 88, 90 connect corresponding sprockets so that driving the first roller through a chain 92 by means of motors 94 causes the rollers to all be driven in the same direction at the same time.

With particular reference to FIG. 4, the rollers are shown to be spaced slightly apart from each other so that cooling air rises from underneath the rollers therebetween and through the mixture 78 for a cooling effect. In addition, a generally elongated scraper is provided parallel to and adjacent to each roller to scrape adhered material therefrom. Each scraper includes a flat bevelled edge 98 as best seen in FIGS. 2 and 4.

A double screw conveyor is included in the bottom of cooler 28. The double screw conveyor is comprised of a pair of screws 100 that are mounted in longitudinal relation with respect to the cooler adjacent the floor 72 thereof. These screws 100 serve to convey any material that may fall through the rollers 80 and impinge upon floor 72 to the outlet end 30 of cooler 28. The conveying is accomplished by means of motor 102 as seen in FIGS. 1 and 2.

With particular reference to FIG. 3, it may be noted that the bottom floor 72 has an upright V-shaped rib 104 therein intermediate the screws 100. This aids in feeding the material to the screw conveyors. Further aiding feeding of the material is the inclination of the sidewalls in the bottom portion 68 wherein the walls initially are angled laterally outwardly at 106 and then laterally inwardly at 108 so as to fairly closely encompass the diameter of each of the screws.

Thus Applicant has provided an improved process and apparatus for producing fire logs which is continuous in operation and does not possess the deficiencies of prior art batch methods.

While the invention is illustrated with respect to a specific embodiment, it is to be understood that numerous changes and modifications may be made in the construction arrangement of parts of the invention without departing from the spirit and scope thereof as defined by the appended claims.

What is claimed is:

1. A process for continuously producing fire logs comprising the steps of:
    providing a combustible starting ingredient in the form of sawdust,
    providing a binder in the form of wax,
    heat said wax binder to a liquid state,
    mixing said combustible starting ingredient in the form of said wax binder with said sawdust in a mixer to produce a hot mixture,
    cooling said hot mixture in a cooler to produce a cool mixture at substantially ambient temperature suitable for forming, and forming said cool mixture into a log shape, wherein the step of cooling the hot mixture of sawdust and hot wax to substantially ambient temperature comprises,
    continuously adding said hot mixture at a first temperature to a cooler,
    continuously adding inlet air at a temperature lower than that of said hot air mixture to said cooler so that it is in intimate contact with said hot mixture, so as to transfer heat from said hot mixture to said inlet air, and
    exhausting the inlet air from said cooler as exhaust air at a temperature higher than the temperature of said inlet air.

2. The process of claim 1 further including the step of cooling at least part of said inlet air prior to adding to said cooler.

3. The process of claim 2 further including the step of mixing the cooled air with ambient air prior to adding to said cooler.

4. The process of claim 1 wherein said step of forming comprises extruding said cool mixture to produce a generally cylindrical log shape.

5. The process of claim 4 further including the step of cutting off said generally cylindrical log shape so as to produce fire log lengths.

6. The process of claim 5 further including the step of wrapping said fire log lengths with a protective cover.

7. The process of claim 6 further including the steps of check weighing and hand case packing said fire logs into cases.

8. The process of claim 7 further including the step of palletizing said cases.

9. The process of claim 4 further including the step of adding fire enhancement compounds to said cool mixture prior to the step of forming.

10. A cooler for cooling a hot product comprising a generally elongated hollow body defining a pair of side walls, a pair of end walls, top and bottom walls, and further defining inlet and outlet ends, means defining an air inlet opening in said inlet end, means defining an air outlet opening adjacent said outlet end, means defining a hot product opening adjacent said inlet end, means defining a cool product opening in said outlet end, means defining a cool product opening adjacent said outlet end, a conveyor means within said body for conveying said product from said hot product opening to said cool product opening whereby air flow from said air inlet opening to said air outlet opening cools the hot product entering said hot product opening so that a cool product is discharged from said cool product opening wherein said conveyor means comprises a first conveyor in the form of a plurality of spaced, generally parallel rollers rotatably mounted on said side walls intermediate and spaced from said top and bottom walls and motor means for driving said rollers, and wherein said conveyor means further comprises a second conveyor intermediate said first conveyor and said bottom wall, said second conveyor being spaced from said first conveyor, and motor means for driving said second conveyor, whereby product passing between said rollers of said first conveyor falls onto said second conveyor for subsequent transfer to said cool product opening.

11. The invention of claim 10 wherein said means for rotating said rollers comprises a motor.

12. The invention of claim 11 wherein said rollers are each mounted on an elongated shaft, and wherein adjacent rollers are connected together for rotation by an interconnecting drive arrangement, whereby driving a first of the plurality of rollers causes corresponding driving of each of the others of the plurality.

13. The invention of claim 12 further including an elongated scraper mounted adjacent each one of said plurality of rollers for removing adhered product.

14. The invention of claim 10 wherein said bottom wall defines a bottom portion having a generally horizontal floor and wherein said walls are a pair of sidewalls extending generally upwardly therefrom and wherein said second conveyor comprises at least one screw conveyor located adjacent said floor and closely proximate said sidewalls so as to carry away product passing through said rollers and collecting on said floor, and wherein said motor means comprises a motor.

15. The invention of claim 14 wherein the number of screw conveyors is two, located in side by side, generally parallel relation and wherein said sidewalls are angled laterally outwardly from said floor to a certain height and then inwardly in relation to said floor.

16. The invention of claim 15 further including a V-shaped upwardly directed rib in said floor intermediate said screw conveyors.

* * * * *

UNITED STATES PATENT AND TRADEMARK OFFICE
CERTIFICATE OF CORRECTION

PATENT NO. : 4,042,343
DATED : August 16, 1977
INVENTOR(S) : Brian C. Bernard

It is certified that error appears in the above-identified patent and that said Letters Patent are hereby corrected as shown below:

Column 1, line 35, "Accordngly" should read --Accordingly--;

line 46, "consisting" should read --consistency--;

line 63, "the" should read --this--

Claim 1, line 6, "heat" should read --heating--.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks